April 23, 1940.  M. KATCHER  2,197,889
STEERING KNUCKLE JOINT
Filed June 11, 1938
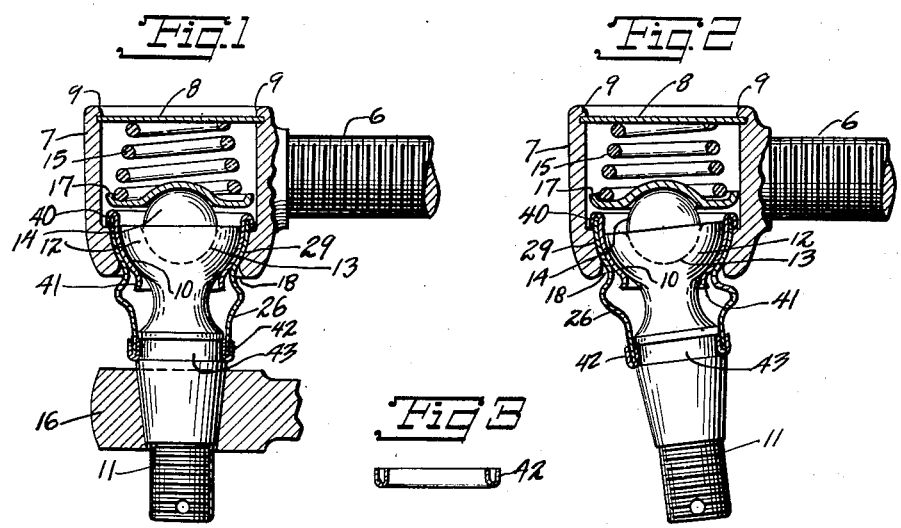
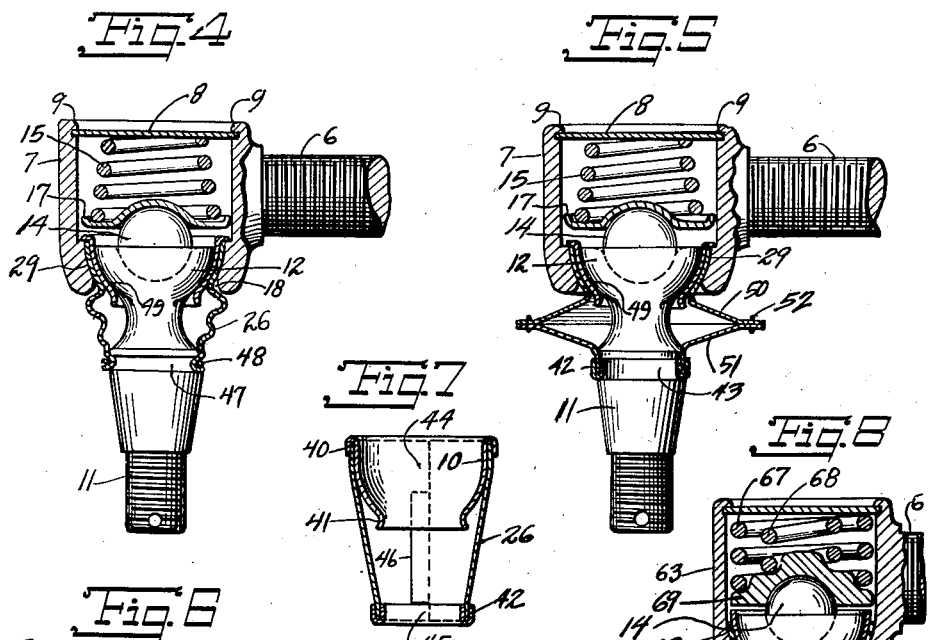
INVENTOR
Morris Katcher
BY
Emanuel Scheyer
ATTORNEY Patented Apr. 23, 1940

2,197,889

UNITED STATES PATENT OFFICE 2,197,889

STEERING KNUCKLE JOINT

Morris Katcher, New York, N. Y.

Application June 11, 1938, Serial No. 213,125

7 Claims. (Cl. 287—90)

This application is a continuation in part of my copending application Serial No. 188,222, now Patent No. 2,178,206 of October 31, 1939.

This invention relates to a steering knuckle joint providing limited universality of movement and is particularly adapted for use in tie rod and drag link connections for the steering mechanism of automotive vehicles.

It is an object of this invention to provide dust exclusion means for the joint which will permit the relative movement of the housing and the stud and yet prevent dust from entering the housing. The dust exclusion means comprises a cap of flexible substantially inelastic material preferably leather, although the material need not necessarily be inelastic as long as it is flexible and unaffected by the oil from the knuckle and substantially impervious to the oil.

The steering knuckle joint of this invention is in general similar to those shown in my pending application Serial No. 188,222 except for certain modifications relating to the dust excluding means.

Other objects and advantages will become apparent upon further study of the description and drawing in which:

Fig. 1 is a transverse section of the device showing a portion of the steering knuckle wrist, the stud being positioned at right angles to the housing.

Fig. 2 is a transverse section of the device of Fig. 1 with the stud tilted with respect to the housing as far as it will go.

Fig. 3 is a section through the ring by itself, which is to be used for crimping around the lower edge of the dust shield or cap.

Fig. 4 is a section through the device showing a modified form of fastening the upper and lower edges of the dust cap.

Fig. 5 is a section through the device showing a modified form of the dust cap.

Fig. 6 is a development of the sheet of material used for the dust cap of Fig. 1.

Fig. 7 is a section of the bushing shown with the dust cap in extended position and the clamping ring at its bottom, said parts being removed from the rest of the device.

Fig. 8 is a section through the device showing a dust cap made of flexible elastic material such as synthetic rubber.

Threaded shank 6 is provided with a housing 7 at its end. The upper end of housing 7 is closed by means of a circular plate 8 set in a groove near said end, the upper edges of the housing being peened over at 9 to retain said plate. The lower end of housing 7 on the inside is concaved to present a surface 29 in the form of a spherical zone. Nesting in said lower end is a bushing 10. The upper portion of the inner surface of said bushing is also in the form of a spherical zone. The upper end of bushing 10 is folded over and crimped on the upper edge of dust exclusion cap 26, the folded over portion forming a retaining flange 40, while the lower portion of the bushing is flared out to form an apron 41. Between the outer surface of the upper portion of bushing 10 and surface 29 is pinched the upper portion of dust exclusion cap 26. Cap 26 is preferably made of leather. Other flexible material, elastic or inelastic, so long as it is substantially impervious to the flow of oil therethrough and not affected by oil, will do. With substantially inelastic material as leather, cap 26 is provided with slack to allow for the tilting of stud 11, Fig. 2, with respect to housing 7.

Bushing 10 is made of anti-friction metal such as phosphor-bronze. Stud 11 is provided with a head 12 whose side surface is in the form of a spherical zone fitting inside of bushing 10. A portion 16 of a steering knuckle wrist is shown engaging stud 11. The top of head 12 is flat except for a substantially hemispherical depression or socket 13. The center of the sphere, of which depression 13 is a segment, is in axial alignment with the longitudinal axis of stud 11. Mounted in socket 13 is a ball bearing 14. Compression spring 15 presses socket cap 17 down on ball bearing 14, the upper end of said spring reacting against the bottom of plate 8. The pressure of spring 15 produces a certain desirable amount of friction between head 12 and the inside of bushing 10 which prevents rattling and lost motion. Further said pressure moves the parts together to take up for wear. Apron 41 of bushing 10 extends out through opening 18 of housing 17. Apron 41 is sufficiently flared out to permit a limited amount of swinging of stud 11, Fig. 2, about the center of ball bearing 14 as a pivotal axis. The lower end of cap 26 is crimped in a ring 42 which has an inside diameter such that it can be snapped into shallow groove 43 on stud 11.

Heretofore it has been the sides of opening 18, through which stud 11 extends, which limited the swing of said stud with respect to the housing. But in the present invention if such were the case, cap 26 would be pinched between stud 11 and housing 7 at the edge of hole 18. This pinching would puncture cap 26 and destroy its usefulness.

In assembling the knuckle joint, first bushing 10 with cap 26 attached is let into housing 7, the lower portion of said cap extending through opening 18. Stud 11 is then inserted through housing 7 bushing 10 and cap 26. Ring 42 carrying the lower end of cap 26 is then snapped into groove 43 on stud 11. Ball bearing 14 is then placed in depression 13 and cap 17 placed on top of it after which spring 15 is inserted and plate 8 peened in housing 7.

The sheet of material, Fig. 6, forming cap 26 is provided at one end of an edge with a notch 44, and at the other end of said edge with a notch 45, giving rise to a tongue 46. The sheet in Fig. 6 is shown upside down from its position in Fig. 7. When said sheet is bent around into a truncated cone to form cap 26, Fig. 7, tongue 46 overlaps the opposite edge of the sheet and is fastened thereto. Notch 44 is of such depth that there is no double thickness of cap 26 where it comes between bushing 10 and surface 29 of housing 7. Similarly, notch 45 is of such depth that there is no double thickness of the cap inside of ring 42.

In Fig. 4, cap 26 instead of being crimped in such a ring as ring 42, is held in a groove 47 by means of a wire ring 48. The upper part of cap 26 is not crimped between a flange and the body of the bushing but is just wedged in between bushing 49 and the surface 29 of housing 7.

The dust cap of Fig. 5 is made of two formed washers 50 and 51, the upper part of washer 50 being wedged between bushing 49 and housing 7. The lower part of washer 51 is crimped in a ring 42 set in a groove 43 as in Fig. 1. The outstanding edges of washers 50 and 51 are fastened together by stitching 52. Instead of fastening the top of washer 50 as shown in Fig. 5, it could be crimped by a flange 40 as in Fig. 1. Likewise a wire ring 48, as in Fig. 4, could be used to fasten the bottom of washer 51. As is readily seen, there is plenty of slack in the dust cap formed by washers 50 and 51 to allow for relative motion between stud 11 and housing 7.

The modified knuckle shown in Fig. 8 is provided with a synthetic rubber cap 60 whose upper portion comes in between bushing 61 and the inside surface 62 of the lower end of housing 63. The lower end of cap 60 is formed over a ring of wire 64 which hubs stud 65 in groove 66. Cap 60 stretches to accommodate the swing of stud 65 relatively to housing 63. Cap 60 prevents dust from entering the interior of housing 63. Compression springs 67 and 68 press socket piece 69 down on ball bearing 14. Synthetic rubber for cap 60 is preferred to ordinary rubber because it is more resistant to deterioration caused by oil.

The terms "below", "above", "upper" and "lower" as used in the claims are intended to be relative only.

I claim:

1. A joint comprising a housing, a bushing of anti-friction material set in said housing in fixed contact therewith, said bushing having a spherical inner bearing surface, a stud extending into the housing through an aperture therein and in the bushing, said stud having a head with a spherical outer surface in a true bearing fit with the bearing surface of the bushing, means in the housing in engagement with said head for maintaining said surfaces in engagement while permitting their relative universal sliding motion, and a tubular cap of flexible relatively thin sheet material open at opposite ends, the upper portion of said cap coming between the outside of the bushing and the inside of the housing being held therein with a fixed grip, the lower portion of the cap encircling the stud and being attached thereto, closing off the lower end of the cap.

2. A joint comprising a housing, a bushing of anti-friction material set in said housing, said bushing having a spherical inner bearing surface, a stud extending into the housing through an aperture therein and in the bushing, said stud having a head with a spherical outer surface in a true bearing fit with the bearing surface of the bushing, the upper end of said bushing being doubled over on itself to form an outer and downwardly extending flange, means in the housing in engagement with said head for maintaining said surfaces in engagement while permitting their relative sliding motion, and a tubular cap of flexible sheet material open at opposite ends, the upper end of said cap being crimped between the bushing and its flange, the lower end of the cap encircling the stud and attached thereto closing off said latter end.

3. A joint comprising a housing, a bushing of anti-friction material set in said housing, said bushing having a spherical inner bearing surface, a stud extending into the housing through an aperture therein and in the bushing, said stud having a head with a spherical outer surface in a true bearing fit with the bearing surface of the bushing, means in the housing in engagement with said head for maintaining said surfaces in engagement while permitting their relative sliding motion, and a tubular cap open at opposite ends, the upper portion of said cap being pinched in between the outside of the bushing and the inside of the housing, the lower portion of the cap encircling the stud and being attached thereto, closing off the lower end of the cap, said cap being formed from a flat sheet of flexible material curled to have its opposite edges butt at the portion pinched in between the bushing and the housing, the portion of said sheet below the pinched in portion having one edge provided with a tongue overlapping the opposite edge of the sheet and fastened thereto.

4. In a joint as claimed in claim 1, means upon the bushing for engaging the stud for limiting the relative sliding motion between surfaces of the bushing and head to prevent contact between the stud and the housing where the cap comes between them.

5. A joint as claimed in claim 1, in which the lower portion of the bushing projects through the aperture of the housing extending below the bottom of the latter for engaging the stud for limiting the relative sliding motion between the surfaces of the bushing and head to prevent contact between the side of the stud and the lower portion of the housing where the cap comes between them.

6. A joint as claimed in claim 1, in which the lower portion of the bushing is of substantially less diameter than the diameter of the aperture in the housing, said lower portion engaging the stud for limiting the relative sliding motion between the surfaces of the bushing and the head to prevent contact between the stud and the lower portion of the housing where the cap comes between them.

7. In a joint as claimed in claim 3, a metal ring encircling the stud for holding the lower end of the cap to the stud, the opposite edges of the cap butting where held by said ring.

MORRIS KATCHER.